United States Patent [19]
Koide et al.

[11] Patent Number: 6,030,542
[45] Date of Patent: *Feb. 29, 2000

[54] POLYESTER FILM FOR LEADER TAPES, AND A PRODUCTION PROCESS THEREOF

[75] Inventors: Kazuyoshi Koide, Shiga; Ken-iti Sato, Shizuoka; Kazuo Okabe, Shiga, all of Japan

[73] Assignee: Toyo Metallizing Co., Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/693,040
[22] PCT Filed: Dec. 26, 1995
[86] PCT No.: PCT/JP95/02699
§ 371 Date: Oct. 22, 1996
§ 102(e) Date: Oct. 22, 1996
[87] PCT Pub. No.: WO96/20243
PCT Pub. Date: Jul. 4, 1996

[30] Foreign Application Priority Data

Dec. 27, 1994 [JP] Japan .................................. 6-340885

[51] Int. Cl.[7] ............................................. B44C 1/22
[52] U.S. Cl. ............................. 216/90; 216/83; 216/91; 216/92; 156/155

[58] Field of Search ...................... 428/156, 192; 216/11, 52, 83, 90, 91, 92, 41, 95; 242/918; 156/155

[56] References Cited

U.S. PATENT DOCUMENTS

| | | | |
|---|---|---|---|
| 3,706,423 | 12/1972 | Neff | 242/195 |
| 3,809,218 | 5/1974 | Furst | 206/53 |
| 4,090,680 | 5/1978 | Farsh | 242/195 |

*Primary Examiner*—Donald Loney
*Attorney, Agent, or Firm*—Austin R. Miller

[57] ABSTRACT

The invention discloses a polyester film for leader tapes, including a polyester film having been brought into contact with an alkaline liquid and etched on at least one side to have a thickness pattern, wherein the polyester film has a tip portion having a thickness of 10 $\mu$m or more and is 80% or less of the original thickness. The invention also includes a process for producing a polyester film for leader tapes including the steps of bringing a polyester film into contact with an alkaline liquid and etching the polyester film at least on one side to form a tip portion having a thickness of 10 $\mu$m or more and 80% or less of the original thickness, with the etched depth controlled differently from position to position, for processing to have a desired thickness pattern.

3 Claims, 5 Drawing Sheets

POLYESTER FILM FOR LEADER TAPES, AND A PRODUCTION PROCESS THEREOF

TECHNICAL FIELD

The present invention relates to a polyester film for the leader tapes used to connect a practically used magnetic tape with a take-up shaft, hub or reel to have the magnetic tape wound around it, and also relates to a production process thereof.

PRIOR ART

For connecting a magnetic tape with a take-up shaft, hub or reel to have the magnetic tape wound around it, a leader tape more excellent in mechanical strength than the magnetic tape is used for preventing that the magnetic tape is damaged by the severe tension acting when the tape starts and stops running. At present, the base used for most magnetic tapes is a biaxially oriented polyester film, and the base used for the leader tape is also a simply thicker polyester film. As a result, in an extreme case, it can happen that a 188 μm thick leader tape is connected with a 12 μm thick magnetic tape. The difference between the magnetic tape and the leader tape in thickness makes the tape winding form irregular, to abnormally deform the magnetic tape, causing recording and reproduction errors.

Methods studied to solve the problem include the use of another material higher in strength as the leader tape, to raise the mechanical strength of the leader tape, for allowing the leader tape to be thinned, the mechanical grinding of the polyester film to thin it only at the joint with the magnetic tape, the sand blasting of the polyester film, to thin it only at the joint with the magnetic tape, etc. However, the use of another material has a problem of cost. The mechanical grinding method has problems of processing accuracy, degree of freedom in thickness pattern, and surface roughness. The sand blasting method has problems of processing accuracy, degree of freedom in thickness pattern, and surface soil. So, these methods are unsatisfactory.

DISCLOSURE OF THE INVENTION

The object of the present invention is to provide a method for highly accurately processing a leader tape made from a polyester film used for connecting said magnetic tape with a take-up shaft, hub or reel to have the magnetic tape wound around it, in order to let the thickness pattern of the leader tape have a desired form such as a taper, thereby providing a polyester film for the leader tape to allow the magnetic tape to remain without being abnormally deformed, and also to provide a production process thereof.

According to a study by the inventors, the object of the present invention can be achieved by a polyester film for leader tapes, comprising a polyester film having been brought into contact with an alkaline liquid, to be etched at least on one side, to have a thickness pattern, and a process for producing a polyester film for leader tapes, comprising the step of bringing a polyester film into contact with an alkaline liquid, to etch the polyester film at least on one side, with the etched depth controlled differently from position to position, for processing to have a desired thickness pattern.

In the polyester film for leader tapes of the present invention, it is preferable that the thickness at the tip is 10 μm or more and 80% or less of the original thickness. If the thickness at the tip is less than 10 μm, the mechanical strength is too low to withstand the use for a long time, and the rigidity is too low to allow easy work of bonding to the magnetic tape. If the thickness at the tip is more than 80% of the original thickness, the effect attributable to thinning cannot be obtained. It is most preferable that the thickness at the tip is 10 μm to 150 μm. Furthermore, in the process for producing a polyester film for leader tapes of the present invention, it is preferable that etching is effected by immersion into an alkaline liquid, and in this case, it is preferable to control the etched depth by controlling the immersion time. Moreover, in the process of the present invention, the polyester film can also be covered with an alkali resistant protective coat on one side of the polyester film, to allow the etching to occur only on the other side.

BRIEF DESCRIPTION OF THE DRAWINGS

Symbols 1 through 8 used in FIG. 3 mean the following.

1: leader tape
2: NaOH aqueous solution
3: leader tape hanger
4: container of NaOH aqueous solution
5: rack
6: linear stepping motor
7: stepping motor driver
8: personal computer

THE MOST PREFERRED EMBODIMENTS OF THE INVENTION

In the present invention, the polyester film is a conventional oriented high polymer film, preferably biaxially oriented high polymer film containing 80% or more of a linear polycondensed high polymer consisting of an aromatic dicarboxylic acid such as terephthalic acid or 2,6-naphthalenedicarboxylic acid and a diol such as ethylene glycol or butanediol, for example, a polyethylene terephthalate film, polybutylene terephthalate film or polyethylene naphthalate film, etc. In view of economy and easiness of etching, a polyethylene terephthalate film can be used most preferably. The polyester film used in the present invention can be strips cut or punched in the form of leader tapes beforehand, or sheets of tens of centimeters in width and length, or a continuous roll. In the case of sheets or roll, the sheets or roll is cut or punched into the form of leader tapes after completion of etching treatment.

The alkaline liquid in the present invention is preferably an aqueous solution of a strong alkali such as KOH, NaOH or LiOH, and among them, NaOH aqueous solution is most preferable. In the present invention, an alcohol such as isopropyl alcohol or a glycol such as ethylene glycol, diethylene glycol, triethylene glycol or polyethylene glycol respectively as a boiling point raising agent, and a quaternary ammonium salt, etc. as a reaction accelerator can be added, as required, to the alkaline liquid. The alkali concentration of the alkaline liquid affects the etching rate, and in the case of NaOH aqueous solution, a concentration of 1 to 50 wt % can be generally adopted, and a concentration of S to 30 wt % can be preferably adopted. If the alkali concentration is less than 1 wt %, the etching reaction rate is too low uneconomically, and if more than 50 wt %, NaOH is remarkably precipitated in the peripheral region in the treatment tank, to lower processing efficiency. The temperature of the alkaline aqueous solution depends on whether or not a boiling point raising agent is contained. If the boiling point raising agent is not contained, the temperature is preferably 60° C. to 100° C., more preferably 80° C. to 95° C. If the temperature is lower than 60° C., the reaction rate is too low uneconomically. If higher than 100° C., water is remarkably evaporated, making it difficult to control the concentration of the NaOH aqueous solution, and if the concentration of the NaOH aqueous solution is too low, there is a possibility of bumping, etc. disadvantageously. When a boiling point raising agent is contained, the temperature of the alkaline aqueous solution can be higher than the above range.

In the present invention, the method for bringing the polyester film into contact with the alkaline liquid is not especially limited, but usually spraying or immersion is used. Especially immersion can be preferably used. Since the object of the present invention is to highly accurately process the leader tape to have a desired thickness pattern such as a taper, immersion is preferable because the contact between the polyester film and the alkaline liquid can be always kept constant in a clear relative position.

Typical thickness patterns in longitudinal direction, of leaders tapes produced according to the process of the present invention are shown in FIG. 1. In (A), the leader tape is tapered almost linearly from a certain point toward the tip on both sides. In (b), an almost constantly thick portion exists at the tip of such a tapered portion. In (C), the thickness changes in steps. In (D), the thickness changes like curves. In (E), etching is effected only on one side of the tape. Of course, these examples can be combined or any other form can also be adopted. The present invention is not limited by or to FIG. 1.

Figure 2:
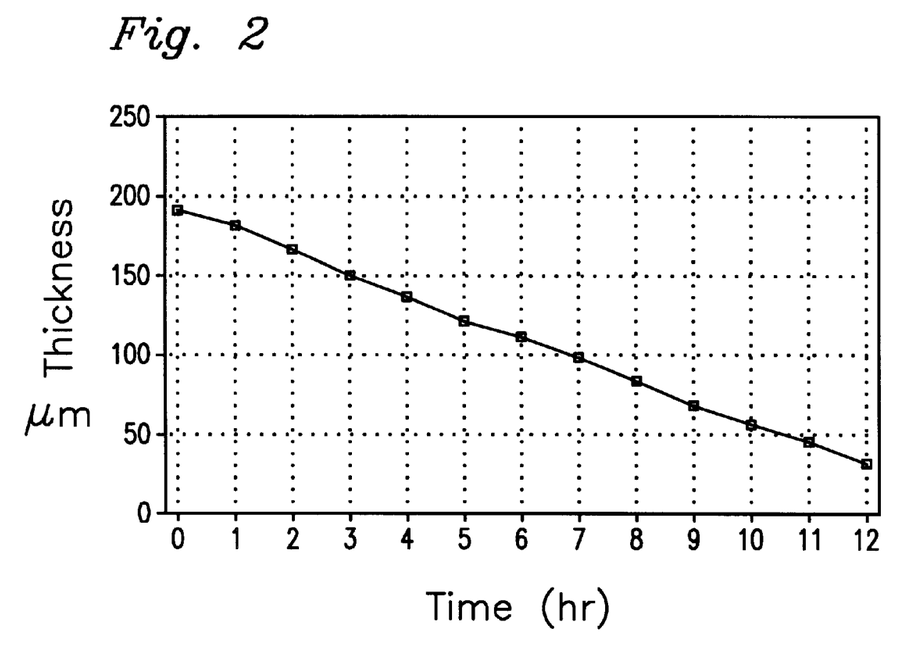
FIG. 2 is a diagram showing the relation between etching time and the thickness of a polyester film.

When these changes of thickness are intended to be achieved by immersion, for example, in the present invention, the time during which the polyester film is immersed in the alkaline liquid is controlled differently from position to position of the film. The immersion time is decided in reference to the polyester film used, the alkaline material used, the concentration of the alkaline material, the temperature of the liquid, and the relation between the processing time depending on whether or not a reaction accelerator is contained, and the etched depth. When a 188 μm thick polyester film is immersed in 10 wt % NaOH aqueous solution heated to 90° C., the relation between the treatment time and the film thickness is, for example, as shown in FIG. 2. In this example, the film thickness decreases almost linearly with the lapse of time, and it can be seen that the etched depth is almost proportional to the etching time.

Figure 1A:
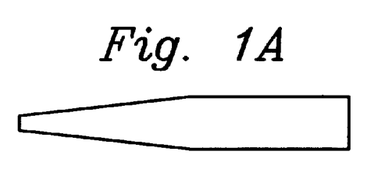
FIG. 1 is typical views showing examples of leader tape thickness patterns.
Figure 1B:
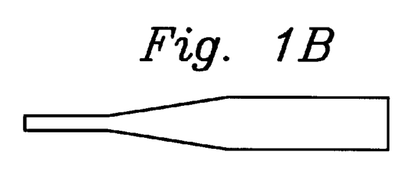
Figure 1C:
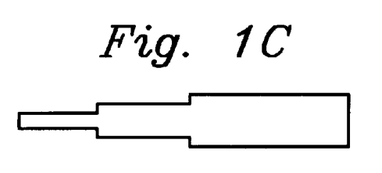
Figure 1D:
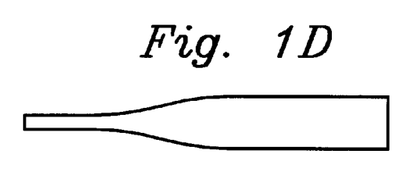
Figure 1E:
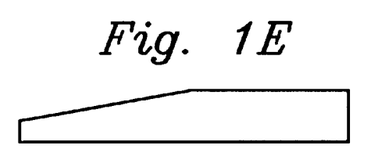

The etching time is controlled by controlling the speed at which the polyester film is lowered into the alkaline aqueous solution or the speed at which the polyester film is raised from the alkaline aqueous solution. For example, in the case of (A) in FIG. 1, a vertically supported polyester film is lowered at any optional speed, and from the moment when the tip of the polyester film is brought into contact with the alkaline aqueous solution, the polyester film is lowered into the alkaline aqueous solution at a predetermined constant descending speed. When the film has been lowered by a certain length, it is quickly raised, to complete the intended etching. On the contrary, even if the film is quickly lowered to a certain length, and raised at a predetermined ascending speed, almost a similar result can be obtained. This applies also to the following description.

In the case of (B) in FIG. 1, the film is quickly lowered by a certain length beforehand, and then lowered at a predetermined descending speed. When the film has been lowered by a certain length, it is quickly raised, to complete the intended etching.

In the case of (C) in FIG. 1, the tape is quickly lowered by a certain length, and stopped for a certain time, and this is repeated by desired times, to complete the intended etching.

In the case of (D) in FIG. 1, the tape is quickly lowered by a certain length, and the descending speed is controlled in reference to the differential function of a function expressing a form similar to the thickness pattern such as a trigonometric function or cubic function, to complete the intended etching.

For immersing the film into the alkaline liquid, a substantially vertically supported film can be lowered and raised, or the alkaline liquid can be lowered and raised, or these two methods can be adopted in combination. In view of simple equipment and easy control of descending and ascending speeds, lowering and raising the film is the most preferable method. The film can be lowered and raised by any conventional method such as winding and unwinding a wire, turning a ball screw, actuating a rack and pinion, or moving a belt, etc. The ascending and descending speeds can be changed by using any conventional speed variable motor or speed change gear, but it is preferable to use a servo motor or stepping motor which allows accurate positioning at a very low speed. The servo motor and stepping motor are not constant in speed in strict sense when the speed is very low, but when the traveling distance per step is sufficiently short, they can be regarded to be substantially constant in speed without any problem. The speeds of ascending and descending motions can be controlled manually, but in view of accuracy, reproducibility, economy, etc., automatic control using a sequencer or computer is preferable.

After completion of etching, to remove the reaction product, alkaline material, reaction accelerator, etc. remaining on the film, rinsing, neutralization by an acid (hereinafter simply expressed as neutralization), and drying can be carried out as required. As required, an ultrasonic washer can be used for rinsing, and sponge, etc. can also be used for friction treatment.

In the above description, the polyester film is etched on both sides almost symmetrically and simultaneously. When it is desired to etch the film on one side only, the film can be covered, on one side, with an alkali resistant material for protection. Specifically, the film can be covered, on one side, with a setting resin such as an acrylic resin, silicone resin, urethane resin or alkyd resin by any conventional method such as using a roll coater, dipping or spraying.

Since the alkaline etching action on the polyester film is a reaction with the molecules of the film, the film is generally less damaged compared with any physical processing such as machining or sand blasting, and a thin film of 100 μm or less can be processed. Furthermore, the processed surface is very fine, and the average roughness achieved is on the order of 1 μm. The processed depth can also be easily controlled, and highly accurate processing can be achieved. The processing time per area which decides the processing cost is shorter than that of machining.

As described above, the polyester film for leader tapes of the present invention can provide commercially highly valuable leader tapes which are very fine and uniform in the surface roughness of the etched portion and excellent in appearance, and do not adversely affect the magnetic tapes. The process for preparing a polyester film for leader tapes of the present invention can exhibit the following excellent effects. This process allows the production of a leader tape with a desired thickness pattern at a high reproducibility.

Furthermore, this process allows the production of commercially highly valuable leader tapes which are very fine and uniform in the surface roughness of the etched portion and excellent in appearance. Moreover, since many leader tapes can be processed at a time, leader tapes with a desired thickness pattern can be produced at a low cost. Still furthermore, even when a 188 μm leader tape is connected with a 12 μm thick magnetic tape, the irregular tape winding form attributable to the thickness difference between the magnetic tape and the leader tape can be decreased to prevent recording and reproduction errors if the leader tape produced according to the present invention is used.

In the present invention, the thickness measurement of etched films was effected down to a graduation of 0.1 μm using Model K351C electronic micrometer, K107C spindle detector and K402B stand produced by Anritsu Corp.

EXAMPLES

The present invention is described below concretely in reference to examples and comparative examples, but is not limited thereto or thereby.

Example 1

Figure 3:
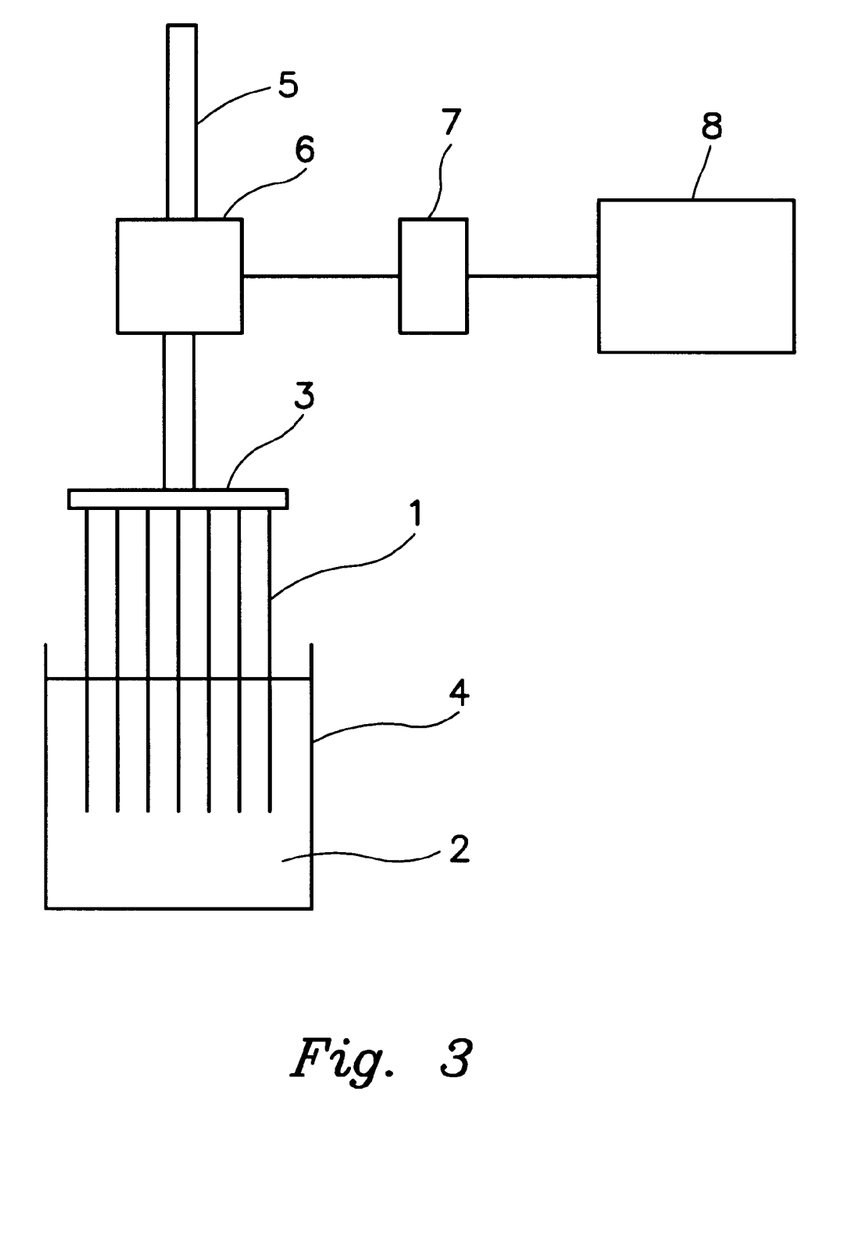
FIG. 3 is a typical drawing showing the equipment used in the examples.

Fifty leader tapes of ½ inch in width and 31.2 cm in length cut out of a biaxially oriented 188 μm thick polyethylene terephthalate film ("Lumilar" Type X30 produced by Toray Industries, Inc.), and etching equipment shown in FIG. 3 were arranged. In FIG. 3, symbol 1 denotes 50 leader tapes; 2, 10 wt % NaOH aqueous solution heated at 90±1° C.; 3, a leader tape hanger; 4, an NaOH aqueous solution container; 5, a rack; 6, a linear stepping motor; 7, a stepping motor driver; and 8, a personal computer. To prevent the NaOH aqueous solution from declining in level due to evaporation, the liquid level was monitored by a float type level gauge and a limit switch (not illustrated), to supply water from time to time, for keeping the variation of the liquid level within 0.5 mm.

Figure 4:
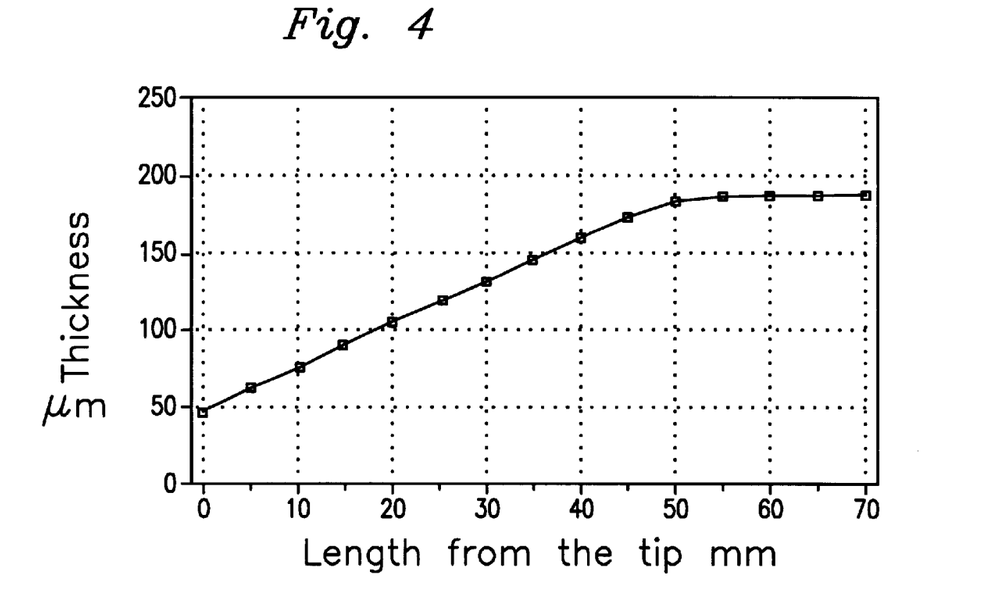
FIG. 4 is a diagram showing the thickness pattern of a leader tape obtained in Example 1.

Furthermore, the NaOH aqueous solution was gently stirred by a magnetic stirrer (not illustrated). The fifty leader tapes 1 were vertically supported by the hanger 3, to keep their bottom ends arranged on a plane. The leader tapes suspended in a space were lowered at a speed of 2 mm/second, and from the moment when the bottom ends of the tapes were brought into contact with the NaOH aqueous solution, they were lowered by 50 mm at a constant speed, taking 10.5 hours. After they were lowered by 50 mm, they were immediately raised at a speed of about 20 mm/second, neutralized and washed by an ultrasonic washer containing 1% acetic acid aqueous solution for 3 minutes, rubbed by sponge brushes on the etched surfaces of both sides, to remove the remaining deposits, washed by flowing water, drained, and naturally dried. The thicknesses of the fifty etched tapes were measured, and the results are shown in Table 1. The thickness pattern of a typical etched tape is shown in FIG. 4. As shown by the graph, the etched tapes of this example increased in thickness almost linearly from each tip, and the differences in thickness among the 50 films were also very small. The etched surfaces on both sides of the tapes looked like satin finished surfaces and uniform, and the boundary line between the etched portion and the non-etched portion was almost straight. Each of the tapes was connected with a polyethylene terephthalate film of ½ inch in width and 12 μm in thickness to be used as a magnetic tape and wound with its tip put into the slit of a 90 mm dia. reel. The joint between the leader tape and the magnetic tape was well adapted to the reel, and the winding form was close to an almost complete circle.

Example 2

Etching was effected as described for Example 1, except that 1 wt % of a quaternary ammonium salt ("DTK-1125" produced by Ipposha Yushi Kogyo K.K.) was added to the NaOH aqueous solution, and that the immersion speed was 50 mm in 1.4 hours. The differences in thickness among the simultaneously processed 50 films were very small. The thickness pattern of the etched portion was similar to that of FIG. 4, showing an almost linear increase of thickness.

Example 3

Figure 5:
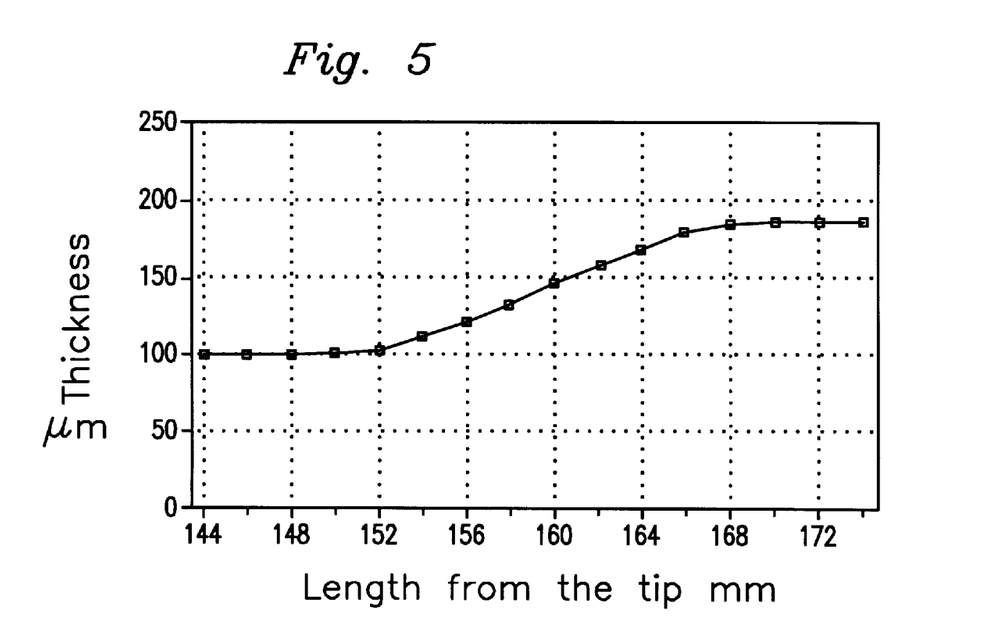
FIG. 5 is a diagram showing the thickness pattern of a leader tape obtained in Example 3.

Leader tapes and etching equipment similar to those of Example 1 were arranged. The tapes in the space above the etchant were lowered at a speed of about 2 mm/second, and from the moment when the bottom ends of the tapes were brought into contact with the NaOH aqueous solution, they were lowered by 152 mm at a speed of about 20 mm/second. Then, they were lowered by 152 mm at a constant speed in 6.6 hours, and raised at a speed of 20 mm/second, to be taken out of the etchant. Subsequently, they were neutralized, washed and dried as described for Example 1. The thicknesses of the tapes at their tips were measured, and the results are shown in Table 1. The thickness pattern of a typical etched tape is shown in FIG. 5. As can be seen from the graph, the etched tapes of this example increased almost linearly in thickness in the range from 152 mm to 167 mm in distance from each tip, and the differences in thickness among the simultaneously processed 50 films were also very small.

Example 4

Figure 6:
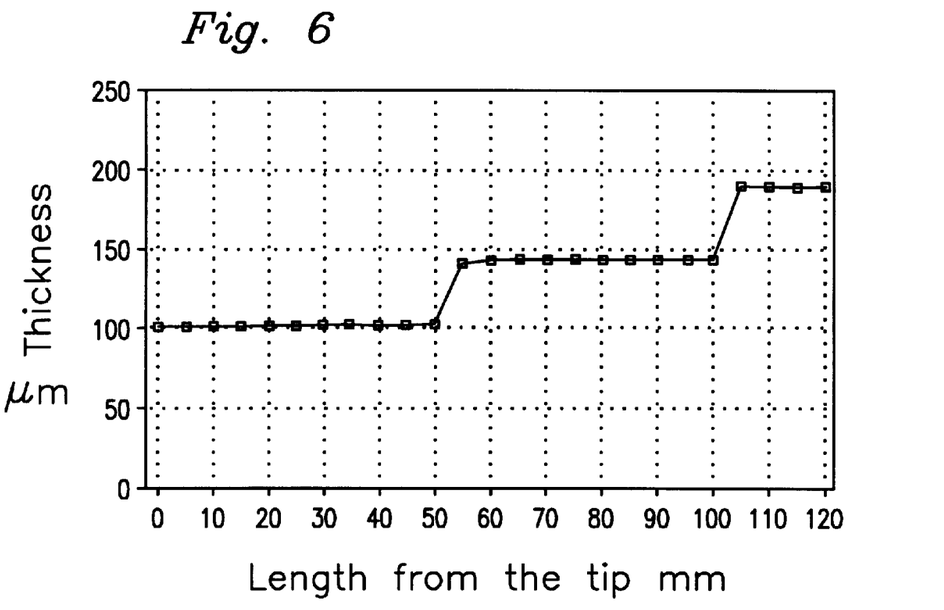
FIG. 6 is a diagram showing the thickness pattern of a leader tape obtained in Example 4.

Leader tapes and etching equipment similar to those of Example 1 were arranged. The tapes were lowered in the space above the etchant at a speed of about 2 mm/second, and from the moment when the bottom ends of the tapes were brought into contact with the NaOH aqueous solution, they were lowered by 50 mm at a speed of about 20 mm/second, and stopped at the position for 5.25 hours, then further lowered by 50 mm, and stopped similarly for 5.25 hours, and raised at a speed of 20 mm/second, to be taken out of the etchant. Subsequently, they were neutralized, washed and dried as described for Example 1. The thicknesses of the tapes at their tips were measured, and the results are shown in Table 1. The thickness pattern of a typical etched tape is shown in FIG. 6. The etched tapes of this example changed in thickness in 3 steps at 50 mm intervals from each tip. The differences in thickness among the simultaneously processed 50 films were also very small.

TABLE 1

|  | Maximum value(μm) | Minimum value(μm) | Difference (μm) | Average value(μm) | σe (μm) |
|---|---|---|---|---|---|
| Example 1 | 56.0 | 46.2 | 9.8 | 48.8 | 1.88 |
| Example 2 | 55.9 | 46.3 | 9.6 | 48.7 | 1.86 |
| Example 3 | 106.9 | 97.3 | 9.6 | 99.9 | 1.60 |
| Example 4 | 107.5 | 95.0 | 12.5 | 97.7 | 2.39 |

Example 5

Ten leader tapes and a NaOH aqueous solution similar to those of Example 2 were arranged. The tapes in the space above the etchant were lowered at a speed of about 2 mm/second, and from the moment when the bottom ends of the tapes were brought into contact with the NaOH aqueous solution, the tapes were lowered by 50 mm at a speed of about 20 mm/second. With this time as t=0 second, they were lowered by 50 mm in 54 hours with the descending speed controlled according to the following empirical formula:

Descending speed (mm/sec)=0.0121×cos (0.00194t)+0.0154

Figure 7:
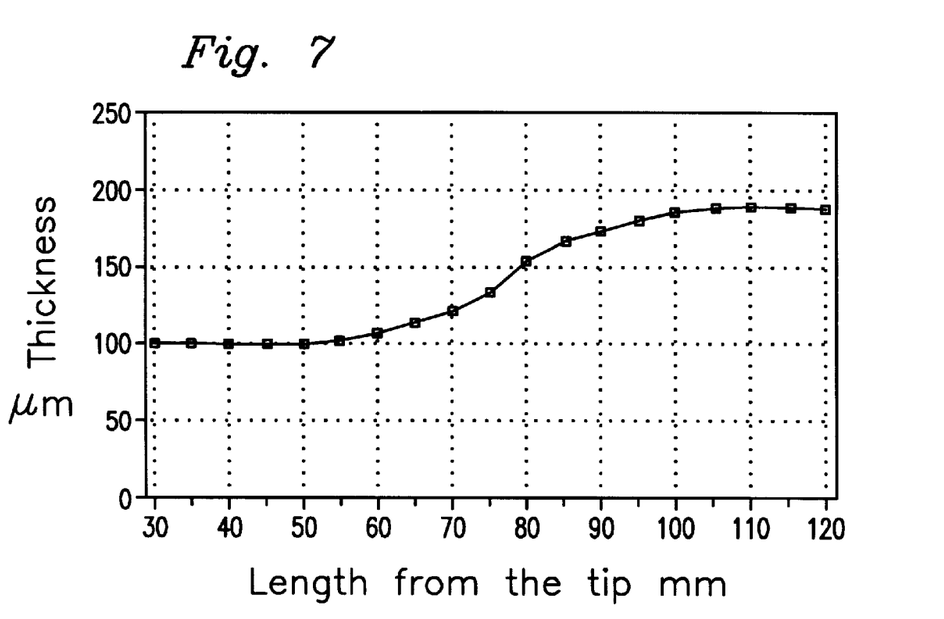
FIG. 7 is a diagram showing the thickness pattern of a leader tape obtained in Example 5.

Then, they were raised at a speed of 20 mm/second, to be taken out of the etchant. Subsequently, they were neutralized, washed and dried as described for Example 1. The thicknesses of the tapes at their tips were measured, and the results are shown in Table 2. The thickness pattern of a typical etched tape is shown in FIG. 7. The etched tapes of this example changed in thickness like a curve in the range from 50 mm to 100 mm in distance from each tip. The differences in thickness among the simultaneously processed 10 films were also very small.

Example 6

One film sheet of 33 cm in length and 10 cm in width was cut out of the same polyester film as used in Example 1, and etched as described for Example 1. The thicknesses of the etched film sheet were measured at 5 points at its tip, and the results are shown in Table 2. The thickness pattern of the etched portion of the film was similar to that of FIG. 4. The etched film of this example increased almost linearly in thickness from its tip, and the differences in thickness in one film sheet were very small. The etched surfaces on both sides of the film sheet looked like satin finished surfaces and uniform, and the boundary line between the etched portion and the non-etched portion was almost straight. The film sheet can be cut or punched into leader tapes with a predetermined width and length from the etched end.

Example 7

A film sheet of 33 cm in width and 1 m in length was cut out of the same polyester film as used in Example 1, and a foamed polyethylene sheet ("Toraypef" Type 30050 produced by Toray Industries, Inc.) of 5 mm in thickness, 20 cm in width and 1 m in length was arranged as a spacer. The longer sides of both the sheets at each one edge were aligned, and the other long side of the spacer was aligned with one end of a hard PVC core of 7 cm in diameter and 25 cm in length. Then, both the sheets were wound around the core, to make a roll. In this case, the roll end on the side without the overlapped spacer was adjusted to form one plane. The roll was suspended with the core-exposed end kept upward, and with the other end kept horizontal, and etched as described for Example 1. However, to replace the NaOH aqueous solution kept between the film layers in the roll, while the roll was lowered by 50 mm at a constant speed, taking 10.5 hours, it was raised, at 1-hour intervals, at a speed of 20 mm/second, to be taken out of the NaOH aqueous solution, allowed to stand for 10 seconds, and lowered to the previous position at a speed of 20 mm/second, to continue etching. After completion of etching, the film roll was taken out at a speed of 20 mm/second, ultrasonically washed, and neutralized, and it was unwound, rubbed on the etched surfaces on both sides by sponge brushes, to remove the remaining deposits, drained, and naturally dried. Furthermore, to straighten the curled film, the film was placed on a flat plate and heated in a 140° C. oven for 5 minutes. The thicknesses of the etched film sheet were measured at 5 points at its tip, and the results are shown in Table 2. The thickness pattern of the etched portion of the film was similar to that of FIG. 4. The etched film of this example increased in thickness almost linearly from its tip, and the differences in thickness in one film sheet were also very small. The film sheet can be cut or punched into leader tapes with a predetermined width and length from the etched end.

Example 8

Five parts by weight of hydroxycyclohexyl phenyl ketone ("Irgacure 184" produced by Ciba Geigy) as a photo polymerization initiator were added to 100 parts by weight of an acrylic urethane resin (Unidic 17-806" produced by Dainippon Ink & Chemicals, Inc.), and the mixture was diluted to 50 wt %. The same polyester film as used in Example 1 was coated, on one side, with the mixture, and dried at 80° C. for 1 minute, then being immediately irradiated with ultraviolet rays using a high pressure mercury lamp, to form an about 4 μm thick resin layer. From the film, as described for Example 1, 10 leader tapes were cut out, and etched as described for Example 1. The thicknesses of the etched ten tapes at their tips were measured, and the results are shown in Table 2. The thickness pattern of the etched portion of any of these tapes was similar to that of FIG. 4. The etched portions of the tapes looked like satin finished surfaces on the polyester film surfaces, and on the side with the resin layer formed beforehand, the gloss was almost similar to that before etching, to show that no etching took place on this side. Also from the fact that the thickness at each tip is about double that in Example 1, it can be seen that the tapes were etched on one side only.

Example 9

Etching was carried out as described for Example 2, except that a 100 μm thick polyethylene naphthalate film (Type Q51 produced by Teijin Ltd.) was used as the film, and that the number of leader tapes was 10. However in this case, the leader tapes were lowered by 50 mm in 6.5 hours. The thicknesses of the etched 10 tapes at their tips were measured, and the results are shown in Table 2. The thickness pattern of the etched portion of each of the films was similar to that of FIG. 4. Furthermore, the etched surfaces on both sides of each of the film sheets looked like satin finished surfaces and uniform.

Comparative Example 1

Figure 8:
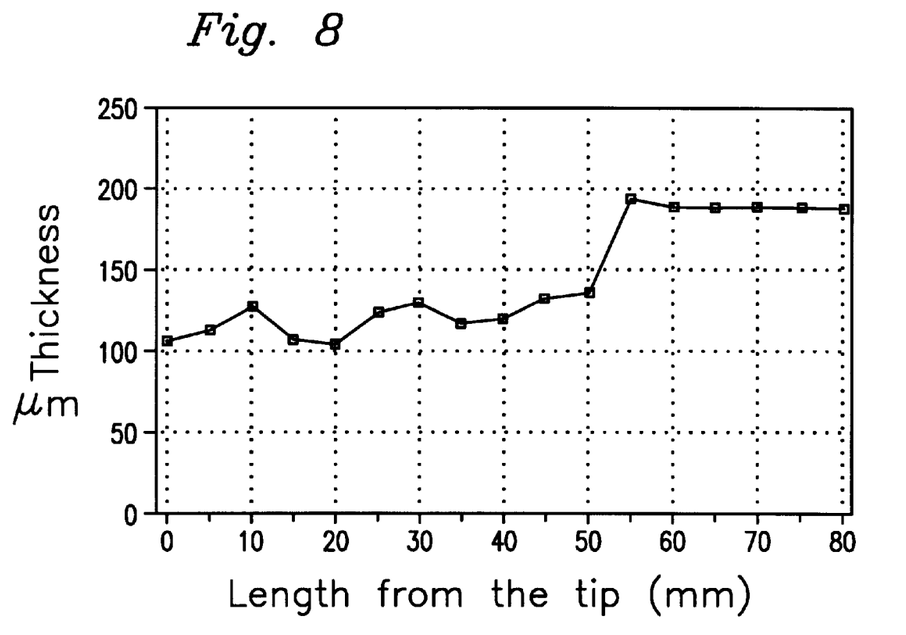
FIG. 8 is a diagram showing the thickness pattern of a leader tape obtained in Comparative Example 1.

A grinding wheel made of GC (H100 in the hardness of abrasive grains) and of 125 mm in diameter and 13 mm in width was set to keep a gap of 0.1 mm as measured by a feeler gauge against a metallic flat plate, and while it was rotated at a speed of about 120 rpm, the same leader tape as used in Example 1 was inserted into the gap between the grinding wheel and the metallic flat plate by 50 mm. It was burred at the ground tip and curled due to heat, and could not be used as a leader tape. It also looked uneven and was rough to touch. In the same way, 10 tapes in total were ground, and the thicknesses of the tapes at their tips were measured. The results are shown in Table 2. The thickness pattern from the tip of one typical tape was very rough as shown in FIG. 8. There was a limit in obtaining any desired thickness pattern using a grinder, and it was very difficult to produce leader tapes with a desired thickness pattern at a reasonable reproducibility.

Comparative Example 2

Figure 9:
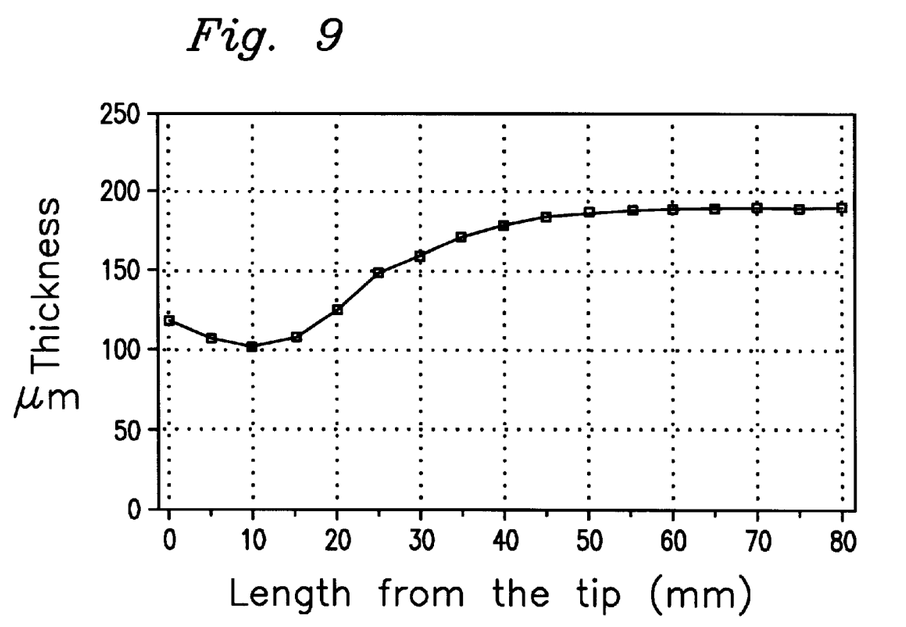
FIG. 9 is a diagram showing the thickness pattern of a leader tape obtained in Comparative Example 2.

The same leader tape as used in Example 1 was placed on a metallic flat plate and fixed by an adhesive tape. A sand blasting apparatus (Model SGT-4(A)) produced by Fuji Seisakusho was used to blast an alundum abrasive of #180 toward the tip of the leader tape at a position of 13 cm away from it at an angle of 30 degrees for 5 seconds (9 mm in nozzle diameter and 4 kg/cm in air pressure). In this way, 10 tapes were blasted, and the abrasive deposited on the surface was washed away. The blasted portions were like satin finished surfaces, and the tapes were not curled. The thickness pattern from the tip of one typical tape is shown in FIG. 9. There was a limit in obtaining any desired thickness pattern by sand blasting, and it was very difficult to produce leader tapes with a desired thickness pattern at a reasonable reproducibility.

TABLE 2

|  | Maximum value($\mu$m) | Minimum value($\mu$m) | Difference ($\mu$m) | Average value($\mu$m) |
| --- | --- | --- | --- | --- |
| Example 5 | 100.4 | 99.0 | 1.4 | 99.8 |
| Example 6 | 49.7 | 48.8 | 1.1 | 49.3 |
| Example 7 | 51.7 | 48.3 | 3.4 | 50.0 |
| Example 8 | 102.3 | 96.6 | 5.7 | 98.6 |
| Example 9 | 53.4 | 50.7 | 1.7 | 52.1 |
| Comparative example 1 | 147.4 | 113.3 | 34.1 | 124.9 |
| Comparative example 2 | 132.5 | 88.6 | 43.9 | 127.1 |

We claim:

1. A process for producing a polyester film for leader tapes, comprising:

bringing a polyester film into contact with an alkaline liquid and etching said polyester film at least on one side to form a tip portion having a thickness of 10 $\mu$m or more and which is 80% or less of the original thickness of said polyester film;

wherein the depth of said etching is controlled differently from position to position; and wherein said polyester film is covered with an alkali resistant protective coat on one side, to allow said etching to take place on the other side only.

2. A process for producing a polyester film for leader tapes, comprising:

bringing a polyester film into contact with an alkaline liquid and etching said polyester film at least on one side to form a tip portion having a thickness of 10 $\mu$m or more and which is 80% or less of the original thickness of said polyester film;

wherein the depth of said etching is controlled differently from position to position; and wherein said alkaline liquid is an aqueous solution having a concentration of 1 to 50 wt %.

3. A process for producing a polyester film for leader tapes, comprising:

bringing a polyester film into contact with an alkaline liquid and etching the polyester film at least on one side to form a tip portion having a thickness of 10 $\mu$m or more and is 80% or less of the original thickness of said polyester film;

wherein the depth of said etching is controlled differently from position to position; and wherein the temperature of said alkaline liquid is 60° C. to 100° C.

* * * * *

UNITED STATES PATENT AND TRADEMARK OFFICE
CERTIFICATE OF CORRECTION

PATENT NO.: 6,030,542
DATED: February 29, 2000
INVENTOR(S): Koide et al

It is certified that error appears in the above-identified patent and that said Letters Patent is hereby corrected as shown below:

In column 3, at line 10, please change "S" to –5–.

In column 9, at approximately line 22, please change "4 kg/cm" to –4 kg $cm^2$–.

Signed and Sealed this

Twenty-fourth Day of April, 2001

Attest:

NICHOLAS P. GODICI

Attesting Officer          Acting Director of the United States Patent and Trademark Office